(12) United States Patent
Fleig et al.

(10) Patent No.: US 6,501,367 B2
(45) Date of Patent: *Dec. 31, 2002

(54) ROTARY ANGLE ENCODER HAVING AN ADJUSTABLE COUPLING

(75) Inventors: Harry Fleig, Appenweier (DE); Uwe Velte, Ottersweier (DE); Erik Maennle, Oberkirch (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/640,885

(22) PCT Filed: May 18, 1995

(86) PCT No.: PCT/DE95/00655

§ 371 (c)(1),
(2), (4) Date: Jun. 19, 1996

(87) PCT Pub. No.: WO96/07874

PCT Pub. Date: Mar. 14, 1996

(65) Prior Publication Data

US 2002/0044041 A1 Apr. 18, 2002

(30) Foreign Application Priority Data

Sep. 3, 1994 (DE) .......................................... 44 31 453

(51) Int. Cl.$^7$ ............................................... H01C 10/32
(52) U.S. Cl. ...................................................... 338/162
(58) Field of Search ............................... 338/162, 163, 338/166, 167, 169, 170, 190, 153

(56) References Cited

FOREIGN PATENT DOCUMENTS

| DE | 3401 505 A1 | 7/1985 |
|---|---|---|
| DE | G 86 28 437.1 | 1/1987 |
| DE | 41 38 589 A1 | 4/1993 |
| DE | G 94 07 988.9 | 9/1994 |

Primary Examiner—Karl D. Easthom
(74) Attorney, Agent, or Firm—Ronald E. Greigg

(57) ABSTRACT

A rotary angle encoder in which the adjustment of the sensor signal desired in the starting position can be changed by simple manipulation. In the rotary angle encoder set forth herein, upon assembly, the coupling is slid only partially onto a cylindrical shaft connected to the sensor part in a first position. In this first position, the coupling can be rotated in relation to the sensor part. Then the sensor signal desired in the starting position is set and after that, the coupling is slid still further onto the cylindrical shaft so that an unintentional rotation of both parts in relation to each other is not possible after the adjustment is complete. The rotary angle encoder is provided for controlling the power of a vehicle drive unit.

9 Claims, 2 Drawing Sheets

ROTARY ANGLE ENCODER HAVING AN ADJUSTABLE COUPLING

PRIOR ART

The invention is based on a rotary angle encoder for controlling a drive unit for control devices.

There are rotary angle encoders for electric control devices or regulating devices, for example like the ones used for electric motor adjustments of throttle valves of internal combustion engines. A coupling part of the rotary angle encoder can be adjusted by a gas pedal coupled to it.

There are rotary angle encoders (DE-A-34 11 455) with a first sensor part disposed fixed in a housing and with a second sensor part, which is supported so that it can rotate in relation to the housing or the first sensor part and which can be adjusted in the direction of rotation via a coupling connected to the gas pedal. Depending upon the relative position of the second sensor part in relation to the first sensor part, the rotary angle encoder generates a sensor signal via an electrical line, which signal can be supplied to an electronic evaluation device.

In a rotary angle encoder, it is particularly important that when the coupling is disposed in a starting position, the sensor signal has a particular, defined value. Often, the sensor signal is defined so that when the coupling is disposed in its starting position, the initial signal is zero.

In the known rotary angle encoder, the second sensor part is connected to a rotary shaft on which a conical fluting is provided. When assembled, the coupling part is pressed against the fluting via a nut. To adjust the rotary angle encoder, this nut is loosened and the coupling is rotated in relation to the rotary shaft until the sensor signal has the desired value in the particular starting position of the coupling part. After the adjustment of the rotary angle encoder, the nut is tightened so that the coupling part is fixed in relation to the second sensor part.

The known embodiment has the particular disadvantage that the nut eventually loosens. Furthermore, subsequent improper manipulations and changes of the adjustment can easily occur.

Incidentally, this kind of adjustment is not particularly easy and in large-scale mass production, requires an expenditure which should not be ignored.

ADVANTAGES OF THE INVENTION

The rotary angle encoder embodied according to the invention has the particular advantage over the prior art of an essentially more reliable, simpler, and better potential adjustment.

The rotary angle encoder advantageously permits a structural form which is easy to assemble and reasonably priced. The rotary angle encoder can be advantageously embodied so that only detent connections or press connections are required. Problematic screw connections can be eliminated.

Advantageous updates and improvements of the rotary angle encoder are possible as a result of the steps taken herein.

Providing a cylindrical shaft either on the second sensor part or on the coupling produces a simple, advantageous possibility for adjusting the coupling part in relation to the second sensor part, from the first position into the second position.

By providing a frictional, non-positive connection between the coupling and the second sensor part in the first position, a relative rotation of the second sensor part in relation to the coupling part can advantageously be easily achieved and by providing a positively engaging connection between the coupling part and the second sensor part, the advantage is achieved that in the second position, an unintended relative rotation of the coupling part in relation to the second sensor part is reliably prevented.

The use of the cylindrical shaft to support the second sensor part and the coupling part essentially simplifies the construction of the rotary angle encoder.

In a particularly simple manner, the snap device prevents an unintended adjustment of the relative position of the coupling part in relation to the second sensor part, from the second position into the first position.

BRIEF DESCRIPTION OF THE DRAWINGS

A selected, particularly advantageous exemplary embodiment of the rotary angle encoder is shown in a simplified manner in the drawings and is explained in detail in the subsequent description. By way of example.

DETAILED DESCRIPTION OF THE EXEMPLARY EMBODIMENT

The rotary angle encoder embodied according to the invention can be used to control various drive units. The drive unit may be an Otto engine, for example, whose throttle valve is adjusted with an adjusting motor. In this case, the rotary angle encoder is used for generating electrical signals which are supplied to the adjusting motor which adjusts the throttle valve. The drive unit, though, can also be a diesel engine or an electric motor; in this case, too, the rotary angle encoder generates electrical signals which, correspondingly converted, control the power of the drive unit. The rotary angle encoder can normally be actuated via a gas pedal.

Figure 1:
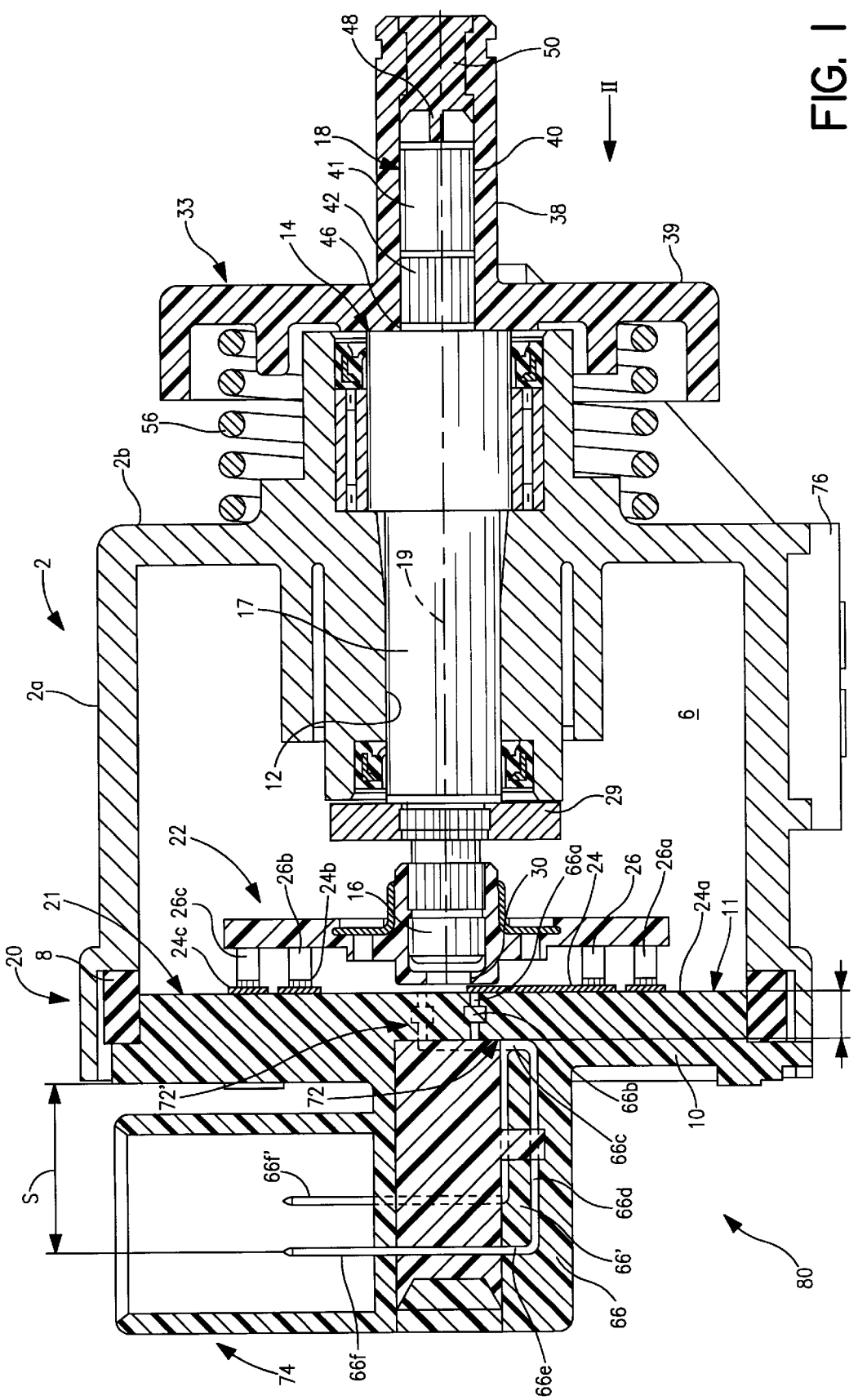
FIG. 1 shows a longitudinal section through the exemplary embodiment.

By way of example, FIG. 1 shows a longitudinal section through the preferred, selected exemplary embodiment. A housing 2 is shown. The housing 2 encloses an inner chamber 6. The housing 2 is embodied as cup-shaped and has a cylinder region 2a and an end face region 2b. The inner chamber 6 is enclosed or closed off in the radial direction by the cylinder region 2a and in the axial direction on one end by the end face region 2b of the housing 2 and on the other end by a plastic part 10. Any easily formed and electrically non-conducting material can be used as the material for the plastic part 10. The plastic part 10 has an end face 11 oriented toward the inner chamber 6. To improve the tightness of the inner chamber 6 in relation to the surroundings, a seal 8 is provided between the plastic part 10 and the cylinder region 2a of the housing 2. Detent tabs can be formed on the plastic part 10, which engage in detent recesses provided on the housing 2. This allows a simple detent connection of the plastic part 10 and the housing 2 without any screws. When assembled, the plastic part 10 constitutes a component of the housing 2. An opening 12 is provided in the end face region 2b of the housing 2. An essentially cylindrical shaft 14 extends through the opening 12. The cylindrical part 14 is embodied in the form of a rotary shaft. The cylindrical shaft 14 has a first end 16 which protrudes into the inner chamber 6, a central part 17 which extends through the opening 12, and a second end 18 which extends outward. The cylindrical shaft 14 is supported in the opening 12 so that it can pivot or rotate around a rotational axis 19.

A sensor 20 is an essential component of the rotary angle encoder. The sensor 20 includes a first sensor part 21 and a second sensor part 22. The first sensor part 21 is a component of the plastic part 10. The first sensor part 21 is nonrotatably connected to the housing 2 via the plastic-part 10. The second sensor part 22 is nonrotatably connected to the cylindrical shaft 14, nonrotatably formed onto the cylindrical shaft 14, or embodied of one piece together with the cylindrical part 14. The second sensor part 22, together with the cylindrical shaft 14 is supported so that it can pivot around the rotational axis by a particular angle of rotation in relation to the housing 2 and therefore in relation to the first sensor part 21.

An electrically conducting resistance strip, which is used as a contact strip 24, is printed on the end face 11 of the plastic part 10 oriented toward the inner chamber 6. The contact strip 24 has a very slight thickness. For clarity, the thickness of the contact strip 24 is shown greatly exaggerated in the drawing. FIG. 1 shows the plastic part 10 and the contact strip 24 in cross section.

A contact point 26 is disposed on the second sensor part 22. The contact point 26 is embodied for example as an electrical slider. The contact point 26 of the second sensor part 22 electrically contacts the contact strip 24 of the first sensor part 21, at least intermittently, depending upon the relative position of the first sensor part 21 in relation to the second sensor part 22. In the exemplary embodiment shown, three other contact points 26a, 26b, 26c, which are embodied in the form of sliders, are connected to the second sensor part 22. The additional contact points 26a, 26b, 26c, electrically contact other contact strips 24a, 24b, 24c printed on the end face 11 of the plastic part 10. The two contact points 26, 26a are for example electrically connected to each other.

Depending upon the relative angle of rotation of the second sensor part 22 in relation to the first sensor part 21, sensor signals are received at plug contacts 66f, 66f', which are described in more detail further below. These sensor signals are analog or digital, depending upon the embodiment of the contact strips 24, 24a, 24b, 24c or the contact points 26, 26a, 26b, 26c. A plurality of redundant sensor signals can also be received. The rotary angle encoder can be embodied so that one of the sensor signals is analog (potentiometer function) and another sensor signal is digital (switch function).

A stop element 29 is connected to the cylindrical shaft 14 or is connected directly to the second sensor part 22. And a stop element 30 is connected to the second sensor shaft 22 or the cylindrical part 14.

Figure 2:
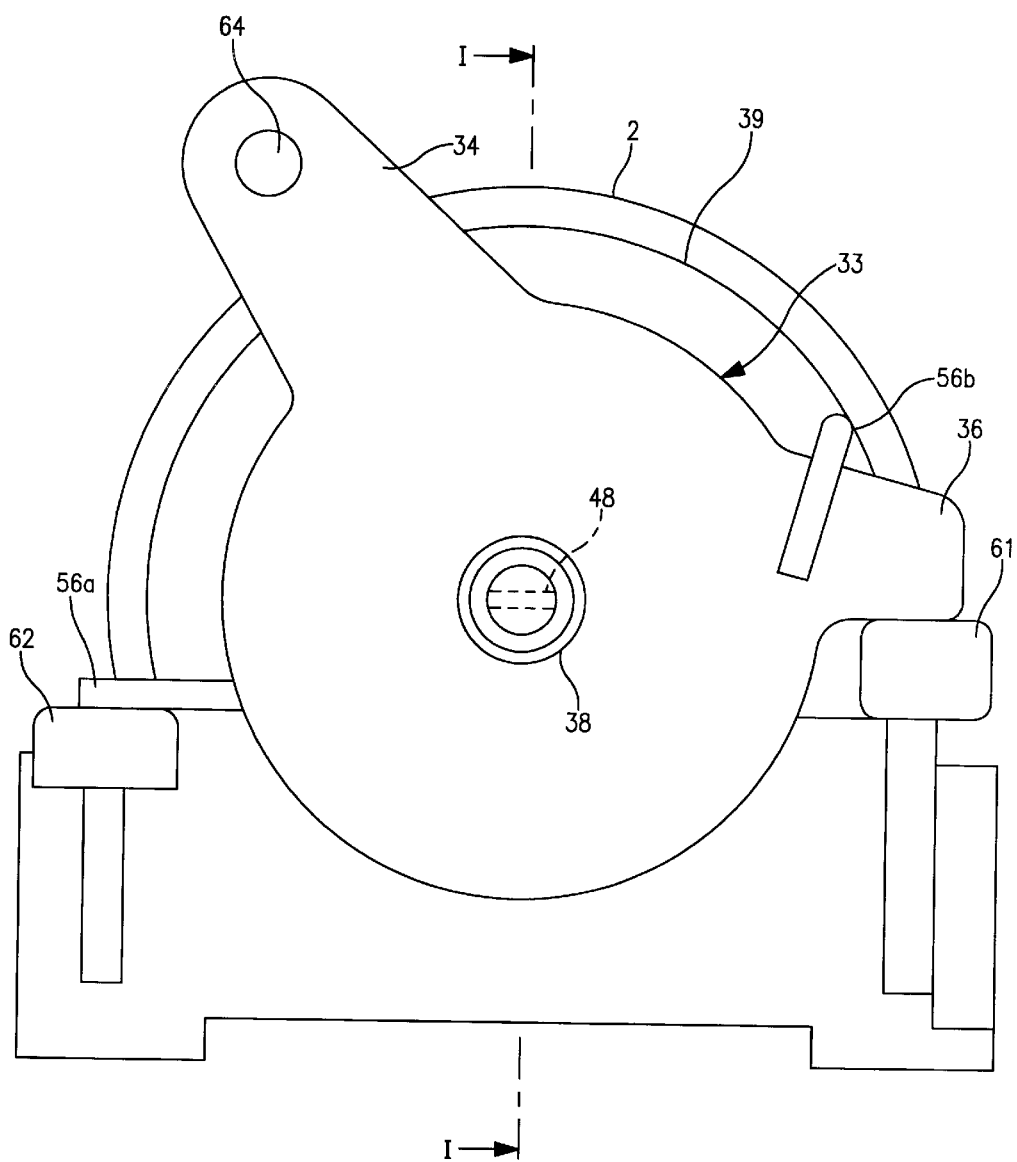
FIG. 2 shows an end view of the exemplary embodiment.

FIG. 2 shows an end view of the rotary angle encoder, which has been chosen by way of example for the description.

In the two drawing figures, parts that are the same or have the same function are provided with the same reference numerals.

The rotary angle encoder includes a coupling 33. The coupling 33 is connected to a gas pedal, not shown, for example via transfer means which are not shown. The coupling 33 can be adjusted around the rotational axis 19 by actuating the gas pedal. A somewhat larger lever 34 and a somewhat smaller lever 36 are formed onto the coupling 33 (FIG. 2). The coupling 33 is formed so that viewed in the simplest terms, the difference can be told between an axial part 38 and a radial part 39. The radial part 39 has an essentially larger diameter than the axial part 38. The axial part 38 extends coaxially to the rotational axis 19. A bore 40, which is embodied as stepped, is provided in the axial shaft 38.

The second end 18 of the cylindrical part 14 can be divided into a first region 41, which has a relatively smooth, cylindrical surface, and a second region 42, which has a profile. Considered in the circumference direction, the profile in region 42 has projections and indentations. The projections and indentations in region 42 extend parallel to the rotational axis 19, for example, and are therefore symbolically represented in FIG. 1 as lines extending parallel to the rotational axis 19.

The region 41 with the cylindrical surface has a diameter which is slightly greater than the diameter of the bore 40. Therefore if the axial part 38 of the coupling 33 is slid onto the second end 18 of the cylindrical shaft 14 so far that a part of the region 41 or the entire region 41 with the cylindrical surface is disposed inside the bore 40 of the coupling 33, but the second region 42 is disposed outside the bore 40, then a mutual rotation of the coupling 33 in relation to the cylindrical part 14 and therefore in relation to the second sensor part 22 can be easily achieved by exerting a particular torque. The torque desired for the rotation or the torque suitable for the adjustment of the rotary angle encoder can be selected by means of the constructive choice of compression between the cylindrical part 14 in the region 41 and the bore 40 of the coupling 33. To rotate the coupling part 33 in relation to the second sensor 22 or to adjust the rotary angle encoder, the region 42 with the profile is disposed outside the bore 40 of the coupling 33. The coupling 33 is disposed in a position with regard to the second sensor part 22 which can be described as the first position.

The projections in region 42 of the profile of the cylindrical shaft 14 rise above the diameter of the region 41 of the cylindrical surface. If the coupling 33 is now moved in the axial direction relative to the cylindrical shaft 14, that is parallel to the rotational axis 19, then the region 42 with the profile also dips into the bore 40 of the coupling 33. This occurs because the projections of the profile in region 42 dig into the circumference wall of the bore 40. This can easily occur if the coupling 33, at least in the region of the bore 40, is comprised of relatively soft material or a material which can be plastically or elastically deformed, as is the case when using a conventional plastic. The region 42 with the projections should be harder than the part of the bore 40 which the projections are intended to dig into. After the axially parallel movement of the coupling 33 in relation to the second sensor part 22, the coupling 33 is disposed in a position in relation to the second sensor part 22 which can be described as the second position.

However, it is also possible to provide the region of the bore 40 of the coupling 33, which the region 42 with the profile dips into, with a correspondingly adapted profile as well. In this case, the profile on the cylindrical shaft, engages in the profile on the coupling 33 and the coupling 33 can also be comprised of relatively hard material in the region of the bore 40.

It is also possible to provide the profile with the projections not on the cylindrical shaft 14, but instead on the coupling 33. In this embodiment, upon assembly, the projections of the coupling 33 dig into the cylindrical shaft 14 after the insertion of the sensor.

With a completely inserted and assembled rotary angle encoder (second position), there is a positive fit connection of all elements. The coupling 33 is connected to the sensor part 22 with a positive fit. At the same time, no screws or other fastening elements are required. Also, no securing elements are needed.

As a result of compression and friction between the cylindrical shaft 14 in the region 41 or 42 and the bore 40 of the coupling 33, it is already assured that the coupling 33 is secured on the cylindrical shaft 14 in its provided position.

A notch of relatively small diameter can be provided in the region of the second end 18 of the cylindrical shaft 14. This diameter is preferably smaller than the diameter of regions 41 and 42. When sliding the couplings 33, which is comprised of preferably soft, elastic material, onto the second end 18 of the cylindrical shaft 14, the coupling 33 presses radially against the second end 18 and displaces a part of its material into this notch so that as a result of this additional measure, the coupling 33 is further prevented from unintentionally falling off the cylindrical shaft 14. A snap device 46 is constituted by the notch in the region of the second end 18. The snap device 46 is provided for example at the transition from the second end 18 into the central part 17 of the cylindrical part 14, but can also be provided in any other region of the second end 18 which is overlapped by the bore 40 of the coupling shaft 33. The snap device 46 can be still further improved by providing material which projects inward at the bore 40 and dips into the recess.

However, it is also possible to constitute the snap device 46 by providing a circumferential projection on the cylindrical shaft 14 which projection engages in a recess provided in the region of the bore 40. Since this is a simple reversal of the example shown in the drawing, there is no need to show it in the drawing as well.

The snap device 46 is not always absolutely necessary, but it further improves the rotary angle encoder.

A wrench profile 48 is formed onto the end face of the second end 18 of the cylindrical shaft 14 connected to the sensor part 22, which end face is remote from the central part 17. In the exemplary embodiment shown, the wrench profile 48 is a laterally extending slot in which a screw driver can engage as a tool. While the second end 18 is only partially plugged into the bore 40 (first position), the cylindrical shaft 14 and hence the second sensor part 22 can be rotated in relation to the coupling 33 via the wrench profile 48 while the cylindrical shaft 14 can be secured, for example with a tool that fits, and the coupling 33 is rotated, or the coupling 33 can be secured and the cylindrical shaft 14 can be rotated. If the coupling 33 is slid completely over the second end 18 (second position), then a rotation is no longer possible. If only region 41 is disposed inside the bore 40 (first position), then a relative rotation is possible, and if the second region 42 with its profile is disposed inside the bore 40 (second position), then a relative rotation of both parts 14, 33 is not possible with normal means. To rotationally fix the two parts 14, 33 in relation to each other, it does not matter whether the first region 41 of the cylindrical shaft 14 protrudes axially beyond the bore 40. FIG. 1 shows the rotary angle encoder in the second position.

In the exemplary embodiment shown (FIG. 1), the axial 38 of the coupling part 33 protrudes in the axial direction beyond the cylindrical shaft 14. In this region, the bore 40 can be closed with a molded mass 50. This prevents any possible improper attempt to rotate the coupling 33 in relation to the second sensor part 22 and hence to improperly change the adjustment of the rotary angle encoder. In the region of the coupling 33 which protrudes beyond the cylindrical shaft 14, the bore 40 can be embodied as having a narrowing, which prevents the molded mass 50 from falling out of the bore 40.

The rotary angle encoder includes a restoring device 56. In the exemplary embodiment shown, the restoring device 56 is constituted by a restoring spring. One end 56a of the restoring spring engages the housing 2 and the other respective end 56b of the restoring spring acts upon the coupling 33 (FIG. 2). With reference to the view shown in FIG. 2, the restoring device 56 acts on the coupling 33 in the clockwise direction. The movement of the coupling 33 in the clockwise direction is limited because the smaller lever 36 of the coupling 33 comes into contact with a first housing stop 61 provided on the housing 2. The restoring device 56 can also include a plurality of restoring springs; these restoring springs are embodied to be strong so that there is sufficient force to reliably restore the coupling 33 against the first housing stop 61 even when one of the restoring springs breaks.

There is a coupling point 64 on the lever 34 of the coupling 33. For example, a Bowden cable, not shown, which is connected to a gas pedal, can engage this coupling point 64. The Bowden cable can actuate the coupling 33 counterclockwise (FIG. 2) and counter to the restoring device 56 until the lever 34 comes into contact with a second housing stop 62 provided on the housing 2.

If the coupling 33 rests against the first housing stop 61, then this can be described as the starting position; in this starting position, the sensor signal given off by the rotary angle encoder is intended to have a particular value. This setting of the coupling 33 at the first housing stop 61 normally corresponds to the idle setting of the drive unit. Often what is desired is that in this starting position, the value of the sensor signal is zero. If the coupling 33 rests against the second housing stop 62, then this is the maximal pivot angle of the drive unit and consequently corresponds to the full load setting of the drive unit. Since the housing stops 61, 62 are directly affixed to or formed onto the housing, these can be embodied as very sturdy with no trouble.

To adjust the rotary angle encoder (rotary angle encoder is in the first position), the coupling 33 is actuated against the first housing stop 61 and the second sensor part 22 is adjusted with the aid of the tool that fits until the desired value which corresponds to the idle setting is present at the plug contacts 66f, 66f'. Then the coupling 33 is pushed to the left (with reference to FIG. 1) along the axis 19. The stop element 30 is supported against the plastic part 10. As a result, the coupling 33 is brought from the first position into the second position in relation to the sensor part 22.

An electrical line 66 is cast into the plastic part 10 (FIG. 1). The line 66 for example is a wire with a rectangular cross section. The electrical line 66 extends through the plastic part 10 and ends directly at the end face 11 of the plastic part 10 oriented toward the inner chamber 6. The contact strips 24, 24a, 24b, 24c are printed on the end face 11. Printing technology makes it possible to give the contact strips any shape at all. For example, the contact strip 24 is connected to the electrical line 66. This is manufactured so that the contact strip 24 is given a shape by means of printing technology such that the contact strip 24 overlaps the end of the electrical line 66 which ends at the end face 11 of the plastic part 10. Since the contact strip 24 is deposited using printing technology and is consequently very thin, it is important that the end of the electrical line 66 which is connected to the contact strip 24 ends directly with the end face 11 of the plastic part 10. The electrical line 66 must neither protrude beyond the end face 11 nor produce a recess in the end face 11 at the end of the electrical line 66, because in both cases, a reliable electrical connection of the line 66 and the contact strip 24 would not be assured.

The electrical line 66 is divided into partial regions 66a, 66b, 66c, 66d, 66e, and 66f (FIG. 1). The partial region 66a of the electrical line 66 extends starting from the end face 11 of the plastic part 10 oriented toward the inner chamber 6. At a short distance from the end face 11, the electrical line 66 is bent at a right angle. The line 66 turns into partial region 66c there. Partial region 66c extends essentially parallel to the end face 11 of the plastic part 10 oriented toward the inner chamber 6. At a certain distance from the first bend in the line 66, it is bent once again and in partial section 66d once again extends perpendicular to the end face 11. After a certain distance, the line 66 is bent again and turns into partial region 66e. Partial region 66e exits from the material of the plastic part 10. At this point, the line 66 constitutes a plug contact 66f. In the first partial region 66a, a thickening 66b is formed onto the electrical line 66. In lieu of a thickening, a constriction of the line 66 can also be provided.

The distance between the end face 11 and the partial region 66c of line 66 is described below as distance a (FIG. 1). Distance a is chosen to be as small as possible. It is however at least large enough to assure simple manufacture. Since partial region 66a of the electrical line 66 is very short, even a very different thermal expansion of the electrical line 66 and the plastic part 10 produces only a very slightly different elongation, so that even when there are extreme temperature changes, the line 66 neither protrudes too far from the end face 11 into the inner chamber 6 nor produces too large a recess in the end face 11. Consequently it is assured that the electrical line 66 remains in good electrical contact with the contact strip 24 under all circumstances.

The thickening 66b does in fact also promote the securing of the electrical line 66 inside the plastic part 10. However, since the thickening 66b cannot be made arbitrarily large for technical manufacturing reasons, a securing by means of the thickening 66b is only possible in a limited way, but is not sufficient. The thickening 66b or a corresponding constriction essentially makes the production of the plastic part 10 with the line 66 easier. Depending upon the method of manufacture, the thickening 66b can also be omitted.

The partial region 66d of line 66 is relatively long. As a result, when there are temperature changes, relatively large differences in the length change occur between the plastic part 10 and the line 66 in partial region 66d. Since the partial region 66c of line 66 extends essentially parallel to the end face 11, a fixing of the line 66 inside the plastic part 10 is assured at this point. As intended, this results in the fact that partial region 66a is not influenced even by the relatively large length change of the line 66 in partial section 66d. Even great, extreme temperature changes and therefore great expansion differences between the plastic part 10 and the line 66 in partial region 66d can scarcely change the position of partial region 66a relative to the end face 11. By means of partial region 66c, the line 66 is very precisely fixed lateral to the end face 11. The bending between partial region 66a and partial region 66d, which is shown by way of example as bending twice, constitutes an expansion bend 72. This expansion bend 72 keeps the length change created in partial region 66d away from partial region 66a and ensures that the electrical line 66 neither protrudes from the end face 22 nor forms an inadmissible recess there.

The plastic part 10 also constitutes a plug connection part 74 of a plug coupling. A cable, not shown, is connected to the rotary angle encoder via the plug coupling; the rotary angle encoder can supply sensor signals via this cable to a control device which is not shown.

A distance s is plotted in FIG. 1. The distance s marks the spacing between the plug contact 66f and the outer surface of the housing 2. Since the plug connecting part 74 cannot be made arbitrarily small because of the predetermined size of the plug coupling used, the result is that the dimension s cannot fall below a particular size, which means that partial region 66d must have a particular minimum size. Even if partial region 66d is chosen to be larger still, because of the expansion bend 72, this partial region 66d cannot have a negative influence on the connection between the electrical line 66 and the contact strip 24, even at extreme temperatures.

Apart from the contact strip 24, in the rotary angle encoder shown, another contact strip 24a and correspondingly, a slider 26a connected to the second sensor part 22 are also provided. The contact strip 24a is connected to an electrical line 66'. Also, the end of this line 66' which forms a plug contact 66f' must be far enought removed from the surface of the housing 2 that a contact can be achieved here as well by means of for example a two-row plug coupling. An expansion bend 72' is also provided in line 66'.

A housing foot 76 is formed onto the housing 2. With the aid of the housing foot 76, the rotary angle encoder can be fastened in a stable way to a base provided, for example via screws.

Since the rotation of the coupling part 33 is limited in one direction by the first housing stop 61 and is limited in the other rotation direction by the second housing stop 62, any excess actuation force is kept away from the cylindrical part 14 and consequently also from the sensor 20.

In addition to the task of adjusting the coupling part 33 into its starting position, the restoring spring of the restoring device 56 also has the task of acting on the cylindrical part 14 via the coupling 33 with a slight force in the axial direction so that in the operating state, the stop element 29 rests against the housing 2, as is shown in FIG. 1. In the normal operating state, the stop element 30 does not contact another part. When the coupling 33 presses axially on the cylindrical shaft 14, the stop element 30 ensures that neither the sliders 26, 26a, 26b, 26c nor other parts of the rotary angle encoder are damaged by excessive pressure.

The plug connection part 74 is a component of a plug coupling; for clarity, the other part of the plug coupling, which is plugged together with the plug connection part 74, is not shown.

In principle, it would be possible to dispose the at least one plug contact 66f not lateral to the rotational axis 19 as shown in FIG. 1, but to provide it extending in the same direction, that is parallel to the rotational axis 19. However, because the plug coupling extends adjacent to the plug connection part 74, this orientation would have the certain disadvantage that as a whole, a very long formed body is produced, which cannot be accommodated in most available installation spaces. In the exemplary embodiment shown, because the plug connection part 74 of the plug coupling extends lateral to the rotational axis 19 and consequently the electrical cable connected to it is also connected lateral to the rotational axis 19, considerable advantages are attained with regard to the installation space required for the rotary angle encoder. In an advantageous manner, the expansion bend 72 or 72' allows the lateral disposition of the plug contact 66f or 66f' without reducing the electrical reliability as a result.

In the exemplary embodiment shown (FIG. 1), one end of the cylindrical shaft 14 protrudes into the bore 40 provided in the coupling 33. By correspondingly reversing the apparatus shown in the picture, though, it is also possible to provide a corresponding bore in the cylindrical shaft 14; then the coupling is embodied so that in this variant, a cylindrical shaft of the coupling engages in the bore provided in the cylindrical shaft 14. Also with this variant, by means of an axial adjustment of the coupling 33 in relation to the cylindrical shaft 14, both parts can be adjusted from a first position, in which both parts 14, 33 can be rotated in relation to each other, into a second position, in which this rotation is not possible.

In the exemplary embodiment shown, in the first position, the coupling 33 can be rotated in relation to the cylindrical shaft 14. This makes a rotation possibile and consequently permits an adjustment of the coupling 33 in relation to the second sensor part 22. The same possibility of rotation is achieved when the connection between the cylindrical shaft 14 and the second sensor part 22 is embodied so that both parts 14, 22 can be adjusted from a first position into a second position; in the first position, the cylindrical shaft 14 can be rotated in relation to the second sensor part 22 and in the second position, these two parts 14, 22 are fixed in relation to each other. In this case, the possibility of the adjustment between the coupling 33 and the cylindrical shaft 14 can be omitted. Also with this embodiment variant, in the first position, the coupling 33 can be rotated in relation to the second sensor part 22 so that in this variant as well, the coupling 33 can be adjusted in relation to the second sensor part 22.

The plastic part 10, the first sensor part 21, the electrical lines 66, 66', the plug contacts 66f, 66f', and the plug connection part 74 together constitute a common integrated sensor/plug component 80 which is rugged, compact, and easy to produce. This component 80 is easy to handle and almost indestructible. There are no problematic solder points and there is no sensitive cable hanging from it. After the connection of this sensor/plug component 80 to the housing 2, a rotary angle encoder is achieved which is compact, rugged, and easy to adjust. The rotary angle encoder with the sensor/plug component 80 embodied according to the invention offers the possibility of rapid and simple coupling and de-coupling of a continuing cable which is not shown in the drawing. As shown in FIG. 1, the sensor/plug component 80 is essentially comprised of the plastic part 10, the integrated sensor part 21, the at least one electrical line 66, and the formed-on plug connection part 74; the plastic part 10 can include various plastic parts formed together by casting.

The foregoing relates to preferred exemplary embodiments of the invention, it being understood that other variants and embodiments thereof are possible within the spirit and scope of the invention, the latter being defined by the appended claims.

What is claimed is:

1. A rotary angle encoder for controlling a drive unit, comprising a sensor (20), said sensor (20) includes a first sensor part (21) and a second sensor part (22), wherein the first sensor part (21) is supported in a fixed manner and the second sensor part (22) is supported rotatably about a rotational axis (19) relative to the first sensor part (21) and the second sensor part (22) is adjustable about the rotational axis (19) via a coupling (33), the coupling part (33) can by brought into a first position and into a second position relative to the second sensor part (22), wherein in the first position, a rotation about the rotational axis (19) is possible between the second sensor part (22) and the coupling part (33), and in the second position, a rotation between the second sensor part (22) and tire coupling (33) is prevented, an end of the second sensor part (22) having a an adjusting tool profile that accepts an adjusting tool, the coupling (33) having a bore (40) through which the adjusting tool can be inserted to engage the adjusting tool profile, so that, in the first position, the second sensor part (22) can be adjusted relative to the coupling (33) by engagement of the adjusting tool with the adjusting tool profile.

2. A rotary angle encoder for controlling a drive unit as set forth in claim 1 in which, in the first position of the coupling (33) an essentially frictional connection between the coupling part (33) and the second sensor part (22) is formed due to a pressure fit between the coupling (33) and the second sensor part (22).

3. A rotary angle encoder for controlling a drive unit as set forth in claim 2 in which, the second sensor part (22) includes a cylindrical region (41), and the pressure fit between the coupling (33) and the second sensor part (22) is formed by the cylindrical region (41) being press-fitted into the bore (40).

4. A rotary angle encoder for controlling a drive unit as set forth in claim 3 in which, the cylindrical region (41) has an outside diameter, the bore (40) has an inside diameter, and in a non-assembled state, the outside diameter of the cylindrical region (41) is greater than the inside diameter of the bore (40).

5. A rotary angle encoder for controlling a drive unit as set forth in claim 1 in which, the adjusting tool profile is non-circular, and matched in shape to the adjusting tool so that the adjusting tool can hold the second sensor part from rotating while the coupling part is in the first position and rotated with respect to the second sensor part, and when the coupling and the second sensor part are in the desired relative rotary positions, the coupling part can be moved to its second position.

6. A rotary angle encoder for controlling a drive unit, comprising a sensor (20), said sensor (20) includes a first sensor part (21) and a second sensor part (22), wherein the first sensor part (21) is supported in a fixed manner and the second sensor part (22) is supported rotatably about a rotational axis (19) relative to the first sensor part (21) and the second sensor part (22) is adjustable about the rotational axis (19) via a coupling (33), the coupling (33) can be brought into a first position and into a second position relative to the second sensor part (22), wherein in the first position, a rotation about the rotational axis (19) is possible between the second sensor part (22) and the coupling (33), and in the second position, a rotation between the second sensor part (22) and the coupling (33) is prevented, a stop (61) is provided on the first sensor part (21), an articulation stop (36) is formed on the coupling (33), a restoring device (56) engages the fixed sensor part (21) on one side and the coupling part (33) on another side, and the restoring device (56) adjusts the coupling (33) counter to the first sensor part (21) so that the articulation stop (36) comes into contact with the stop (61).

7. A rotary angle encoder for controlling a drive unit as set forth in claim 6 in which, in the first position of the coupling (33) the essentially frictional connection between the coupling part (33) and the second sensor part (22) is formed due to a pressure fit between the coupling (33) and the second sensor part (22).

8. A rotary angle encoder for controlling a drive unit as set forth in claim 7 in which, the second sensor part (22) includes a cylindrical region (41), the coupling (33) includes a bore (40), and the pressure between the coupling (33) and the second sensor part (22) is formed by the cylindrical region (41) being press-fitted into the bore (40).

9. A rotary angle encoder for controlling a drive unit as set forth in claim 8 in which, the cylindrical region (41) has an outside diameter, the bore (40) has an inside diameter, and in a non-assembled state, the outside diameter of the cylindrical region (41) is greater than the inside diameter of the bore (40).

\* \* \* \* \*